(12) United States Patent
Kwon et al.

(10) Patent No.: US 11,066,068 B2
(45) Date of Patent: Jul. 20, 2021

(54) VEHICLE CONTROL APPARATUS AND METHOD

(71) Applicants: Hyundai Motor Company, Seoul (KR); Kia Motors Corporation, Seoul (KR)

(72) Inventors: Ki Beom Kwon, Gyeonggi-do (KR); Jun Kyung Lee, Seoul (KR); Jae Sun Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 163 days.

(21) Appl. No.: 16/451,704

(22) Filed: Jun. 25, 2019

(65) Prior Publication Data
US 2020/0269832 A1    Aug. 27, 2020

(30) Foreign Application Priority Data
Feb. 25, 2019    (KR) .................... 10-2019-0022003

(51) Int. Cl.
| | |
|---|---|
| *B60W 30/06* | (2006.01) |
| *B60W 40/02* | (2006.01) |
| *B60W 10/18* | (2012.01) |
| *B62D 15/02* | (2006.01) |

(52) U.S. Cl.
CPC .......... *B60W 30/06* (2013.01); *B60W 10/182* (2013.01); *B60W 40/02* (2013.01); *B62D 15/0285* (2013.01); *B60W 2554/00* (2020.02); *B60W 2556/65* (2020.02); *B60Y 2300/06* (2013.01)

(58) Field of Classification Search
CPC .......... B60W 10/182; B60W 2554/00; B60W 2556/65; B60W 30/06; B60W 40/02; B60Y 2300/06; B62D 15/0285
See application file for complete search history.

(56) References Cited

U.S. PATENT DOCUMENTS

| | | | | |
|---|---|---|---|---|
| 8,560,175 | B2 * | 10/2013 | Bammert | B62D 15/0285 701/41 |
| 9,283,960 | B1 * | 3/2016 | Lavoie | B60W 10/20 |
| 10,086,759 | B2 * | 10/2018 | Noh | B62D 15/028 |

(Continued)

FOREIGN PATENT DOCUMENTS

| | | |
|---|---|---|
| KR | 10-2016-0056435 A | 5/2016 |
| KR | 101754888 B1 | 7/2017 |

(Continued)

*Primary Examiner* — Babar Sarwar
(74) *Attorney, Agent, or Firm* — Mintz Levin Cohn Ferris Glovsky and Popeo, P.C.; Peter F. Corless

(57) ABSTRACT

A vehicle control apparatus and method for moving and parking a vehicle double-parked around a parked vehicle are provided. The vehicle control apparatus includes a detector that detects departure intention information of the first vehicle and surrounding information of the second vehicle. A vehicle controller controls autonomous movement of the second vehicle and a processor detects a departure intention of the first vehicle based on the departure intention information. A movement plan of the second vehicle is generated based on the surrounding information when departure intention is detected and the vehicle controller moves the second vehicle based on the movement plan.

21 Claims, 16 Drawing Sheets

(56) References Cited

U.S. PATENT DOCUMENTS

| | | | | |
|---|---|---|---|---|
| 10,144,397 B2* | 12/2018 | Lim | ............... | B60T 7/22 |
| 10,843,731 B2* | 11/2020 | Iwami | ............... | B62D 15/0285 |
| 2004/0260439 A1* | 12/2004 | Endo | ............... | B62D 15/0285 |
| | | | | 701/36 |
| 2009/0259365 A1* | 10/2009 | Rohlfs | ............... | B62D 15/028 |
| | | | | 701/41 |
| 2014/0200769 A1* | 7/2014 | Noh | ............... | B62D 15/0285 |
| | | | | 701/41 |
| 2016/0075326 A1* | 3/2016 | Kiyokawa | ............... | B60W 30/06 |
| | | | | 701/41 |
| 2016/0107690 A1* | 4/2016 | Oyama | ............... | B62D 5/046 |
| | | | | 701/41 |
| 2016/0144857 A1* | 5/2016 | Ohshima | ............... | G08G 1/04 |
| | | | | 701/23 |
| 2017/0129537 A1* | 5/2017 | Kim | ............... | G05D 1/0011 |
| 2017/0229020 A1* | 8/2017 | Colella | ............... | B60W 10/20 |
| 2017/0297624 A1* | 10/2017 | Noh | ............... | B62D 15/021 |
| 2017/0329341 A1* | 11/2017 | Rakshit | ............... | G08G 1/143 |
| 2018/0057057 A1* | 3/2018 | Iwami | ............... | B60W 30/06 |
| 2018/0164830 A1* | 6/2018 | Moosaei | ............... | G05D 1/0246 |
| 2018/0224860 A1* | 8/2018 | Warshauer-Baker | ............... | |
| | | | | G08G 1/166 |
| 2018/0304885 A1* | 10/2018 | Kang | ............... | B60W 30/06 |
| 2019/0096259 A1* | 3/2019 | McQuillen | ............... | B60Q 9/002 |
| 2019/0113933 A1* | 4/2019 | Ha | ............... | G05D 1/0212 |
| 2019/0137290 A1* | 5/2019 | Levy | ............... | G01C 21/3461 |
| 2019/0256106 A1* | 8/2019 | Lee | ............... | B60W 50/14 |
| 2019/0322318 A1* | 10/2019 | Hasejima | ............... | B62D 15/027 |

FOREIGN PATENT DOCUMENTS

| | | |
|---|---|---|
| KR | 10-2018-0041511 A | 4/2018 |
| KR | 10-2018-0119225 A | 11/2018 |

* cited by examiner

VEHICLE CONTROL APPARATUS AND METHOD

CROSS-REFERENCE TO RELATED APPLICATION

This application claims the benefit of priority to Korean Patent Application No. 10-2019-0022003, filed on Feb. 25, 2019, the entire contents of which are incorporated herein by reference.

TECHNICAL FIELD

The present disclosure relates to a vehicle control apparatus and method for moving and parking a vehicle double-parked around a parked vehicle.

BACKGROUND

As the number of vehicles increases compared to the speed of parking space expansion, parking is becoming insufficient. Particularly, due to the lack of parking space, drivers often double-park vehicles. However, this double parking makes it difficult or impossible for other vehicles to exit a parking space.

SUMMARY

The present disclosure has been made to solve the above-mentioned problems occurring in the prior art while advantages achieved by the prior art are maintained intact. An aspect of the present disclosure provides a vehicle control apparatus and method capable of moving and parking a vehicle double-parked around a parked vehicle. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle control apparatus for controlling movement of a second vehicle double-parked around a first vehicle may include a detector configured to detect departure intention information of the first vehicle and surrounding information of the second vehicle, a vehicle controller configured to adjust autonomous movement of the second vehicle, and a processor configured to determine whether the first vehicle has intention to depart based on the departure intention information, generate a movement plan of the second vehicle based on the surrounding information when the first vehicle has the intention to depart, and operate the vehicle controller to move the second vehicle based on the movement plan.

The detector may include a distance sensor configured to sense a distance between the first vehicle and the second vehicle, and a nearby object of the second vehicle and the second vehicle, and a camera configured to capture a surrounding image of the second vehicle. The processor may be configured to analyze a distance information obtained by the distance sensor and the surrounding image obtained using the camera to detect movement of the first vehicle, and determine the intention of the first vehicle to depart based on the movement of the first vehicle.

The detector may further include an impact sensor configured to sense an impact applied to an outer surface of the second vehicle, and the processor may be configured to determine whether the first vehicle has the intention to depart based on a point at which the impact is applied. The vehicle control apparatus may further include a communication device configured to wirelessly communicate with the first vehicle, and the processor may be configured to determine whether the first vehicle has the intention to depart based on whether a vehicle movement request of the first vehicle is received via the communication device.

Additionally, the processor may be configured to determine whether the first vehicle has the intention to depart based on whether the first vehicle is switched from a stop state to startup state via the communication device. The processor may also be configured to determine whether a departure of the first vehicle only by movement of the second vehicle is possible based on the surrounding information of the second vehicle when the first vehicle has the intention to depart, and generate the movement plan of the second vehicle based on whether the departure of the first vehicle is possible.

The processor may be configured to calculate a movement distance and a direction of the second vehicle when the departure of the first vehicle only by the movement of the second vehicle is possible and operate the vehicle controller to move the second vehicle based on the calculated movement distance and the direction. The processor may be configured to select one from at least one third vehicle parked around the second vehicle as an additional moving target vehicle when the departure of the first vehicle only by the movement of the second vehicle is impossible, and determine and output a notification regarding a movement distance and a direction required for the selected third vehicle.

Further, the processor may be configured to select the additional moving target vehicle based on at least one of a distance between the second and third vehicles, a center position of the second vehicle with respect to a center position of the first vehicle, and a departure direction of the first vehicle. The processor may be configured to operate the vehicle controller to park the second vehicle in a vacant parking space caused by the departure of the first vehicle when the first vehicle departs.

According to another aspect of the present disclosure, a vehicle control method of controlling movement of a second vehicle double-parked around a first vehicle may include detecting departure intention information of the first vehicle, determining whether the first vehicle has intention to depart based on the departure intention information of the first vehicle, generating a movement plan of the second vehicle based on surrounding information of the second vehicle when the first vehicle has the intention to depart, and adjusting movement of the second vehicle based on the movement plan.

The detecting of the departure intention information may include sensing a distance between the first and second vehicles using a distance sensor, and obtaining a surrounding image of the second vehicle using a camera. The determination of the departure intention may include sensing movement of the first vehicle by analyzing a distance information obtained by the distance sensor and the surrounding image obtained using the camera, and determining whether the first vehicle has the intention to depart based on the movement of the first vehicle.

Additionally, the determination of the departure intention may include determining whether the first vehicle has the intention to depart based on a position at which an impact is applied when the impact applied to an outer surface of the second vehicle is sensed. The determining of the departure intention may include determining whether the first vehicle has the intention to depart based on whether a vehicle movement request of the first vehicle is received.

The generation of the movement plan of the second vehicle may include determining whether a departure of the first vehicle only by movement of the second vehicle is possible based on the surrounding information of the second vehicle, and generating the movement plane of the second vehicle based on whether the departure of the first vehicle is possible. The determination of whether the departure of the first vehicle is possible may include calculating a movement distance and a direction of the second vehicle when the departure of the first vehicle only by the movement of the second vehicle is possible, and controlling the movement of the second vehicle based on the calculated movement distance and direction.

Further, the determination of whether the departure of the first vehicle is possible may include selecting one from at least one third vehicle parked around the second vehicle as an additional moving target vehicle when the departure of the first vehicle only by movement of the second vehicle is impossible, generating the movement plan of the second vehicle and a movement plan of the selected third vehicle, and adjusting autonomous movement of the second vehicle and the selected third vehicle based on the movement plans.

The selection of the additional moving target vehicle may include selecting the additional moving target vehicle based on at least one of a distance between the second and third vehicles, a center position of the second vehicle with respect to a center position of the first vehicle, and a departure direction of the first vehicle. The vehicle control method may further include parking the second vehicle in a vacant parking space caused by the departure of the first vehicle when the departure of the first vehicle is identified after the movement of the second vehicle is adjusted.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
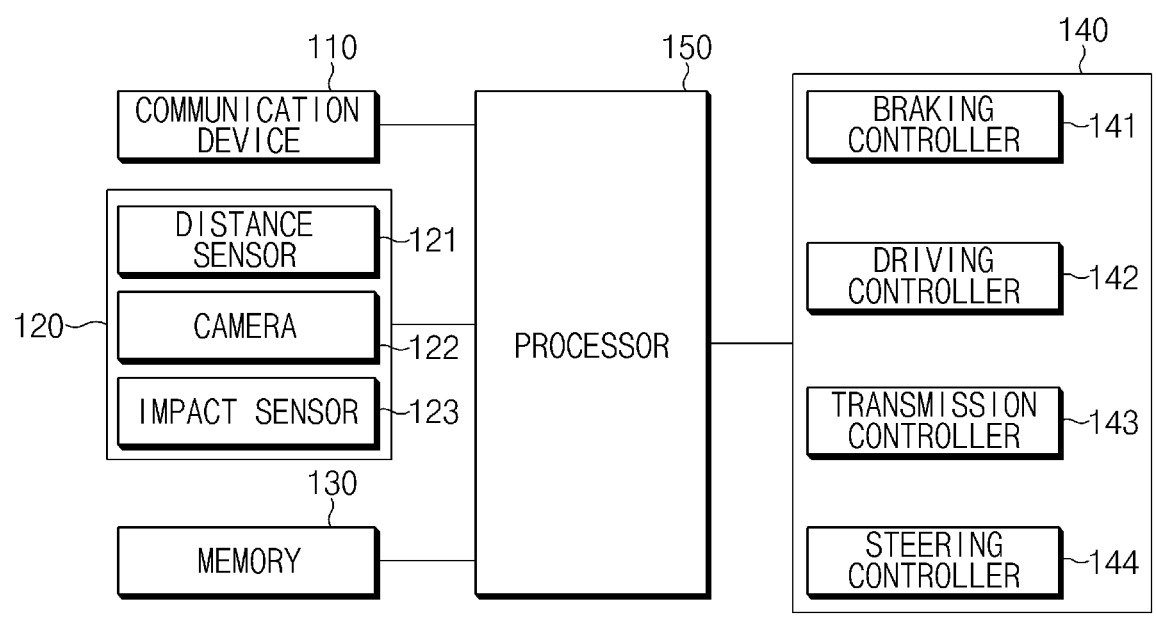
FIG. 1 is a block diagram of a vehicle control apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a technique for moving a double-parked vehicle to allow a parked vehicle to depart when the parked vehicle is prevented from exiting the parking space due to the double-parked vehicle. In the present disclosure, a vehicle already parked in a parking space, that is, a parked vehicle is referred to as a 'first vehicle', a vehicle double-parked around a parked vehicle, that is, a double-parked vehicle is referred to as a 'second vehicle', and a vehicle (another double-parked vehicle) located around the double-parked vehicle is referred to as a 'third vehicle'.

FIG. 1 is a block diagram of a vehicle control apparatus according to an exemplary embodiment of the present disclosure. In this exemplary embodiment, a case where the second vehicle that interferes with the departure of the first vehicle is moved to another location will be described as an example. The vehicle control apparatus, which is a device that is mounted within the second vehicle and is configured to execute the autonomous movement of the second vehicle, may include a communication device 110, a detector 120, a memory 130, a vehicle controller 140, and a processor 150.

The communication device 110 may enable the second vehicle to perform wireless communication with the first vehicle and/or the third vehicle. In particular, the first and third vehicles may include communication devices for wireless communication with the second vehicle. The communication device 110 may support communication using vehicle-to-everything (V2X) technology. The V2X technology may include vehicle-to-vehicle (V2V) communication, vehicle-to-infrastructure (V2I) communication, vehicle-to-nomadic devices (V2N) communication, in-vehicle network (IVN) communication, and the like. In addition, the communication device 110 may support wireless communication using a wireless Internet technology such as wireless LAN (WLAN: Wi-Fi), wireless broadband (Wibro), world interoperability for microwave access (Wimax), and the like, a short-range wireless communication technology such as Bluetooth, near field communication (NFC), radio frequency identification (RFID), infrared data association (IrDA), and the like, and/or a mobile communication technology such as code division multiple access (CDMA), global system for mobile communication (GSM), long term evolution (LTE), and the like.

The sensor 120 may be configured to detect and obtain surrounding information of the second vehicle using a distance sensor 121 and a camera 122. In addition, the sensor 120 may be configured to sense the movement of a vehicle, that is, the first vehicle, around the second vehicle using the distance sensor 121 and the camera 122. The distance sensor 121 may be configured to measure (sense) the distance between the second vehicle and a nearby object (e.g., the first vehicle, the third vehicle, an obstacle, a pedestrian, and the like). The distance sensor 121 may include at least one of distance sensors such as a radar, a light detection and ranging (LIDAR), an ultrasonic sensor, and the like. At least one of the distance sensors may be installed on at least one of the front, rear, top and side surfaces of a vehicle.

The camera 122 or other imaging device may be configured to capture or photograph a surrounding image of the second vehicle. The camera 122 may be implemented with at least one image sensor such as a charge coupled device (CCD) image sensor, a complementary metal oxide semiconductor (CMOS) image sensor, a charge priming device (CPD) image sensor, a charge injection device (CID) image sensor, and the like. The camera 122 may include an image processor (not shown) that performs image processing such as noise elimination, color reproduction, file compression, image quality adjustment, and saturation adjustment on the image obtained using the image sensor.

The sensor 120 may further include an impact sensor 123 configured to sense an impact applied to an exterior of the second vehicle. The impact sensor 123 may be installed inside a center pillar of the second vehicle. For example, when a user (driver) requesting vehicle movement taps the center pillar (B pillar), the impact sensor 123 may be configured to measure the impact applied to the center pillar by the tapping and transmit the measured impact to the processor 150. The memory 130 may be configured to store a program programmed to cause the processor 150 to perform a specified operation. The memory 130 may include image analysis algorithms, path generation algorithms, moving plan algorithms, autonomous driving algorithms, and the like.

The memory 130 may be implemented with at least one of storage mediums (recording mediums) such as a flash memory, a hard disk, a secure digital (SD) card, a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, and the like.

The vehicle controller 140 may be configured to adjust and execute the movement (behavior) of the second vehicle corresponding to an instruction from the processor 150. The vehicle controller 140 may be configured to move the second vehicle to another location based on the movement plan (e.g., planned pathway) generated by the processor 150. The vehicle controller 140 may include a braking controller 141, a driving controller 142, a transmission controller 143 and a steering controller 144. Each of the controllers 141 to 144 may include a processor and a memory.

The braking controller 141 is an electric control unit (ECU) configured to adjust and execute deceleration of the second vehicle. The braking controller 141 may be configured to adjust the braking pressure corresponding to an instruction from the processor 150 to adjust the speed of the second vehicle. Additionally, the braking controller 141 may be implemented as an electronic stability control (ESC). The driving controller 142 is an ECU configured to adjust and execute the acceleration of the second vehicle. The driving controller 142 may be configured to adjust the vehicle speed by adjusting the driving power corresponding to the instruction of the processor 150. The driving controller 142 may be implemented with an engine controller configured to execute the operation of the engine or a motor controller configured to execute the operation of the drive motor.

The transmission controller 143, which is an actuator configured to operate the transmission (speed change) of the second vehicle, may be implemented with an electric shifter (shift by wire, SBW). The transmission controller 143 may be configured to change the gear position (e.g., the drive (D)-stage, the reverse (R)-stage, and the like) corresponding to an instruction from the processor 150. The steering controller 144, configured to adjust the steering of the second vehicle, may be implemented as a motor drive power steering (MDPS). The steering controller 144 may be configured to adjust the steering angle corresponding to an instruction from the processor 150. The processor 150 may be configured to execute the overall operation of the vehicle control apparatus. The processor 150 may be implemented with at least one of an application specific integrated circuit (ASIC), a digital signal processor (DSP), a programmable logic device (PLD), a field programmable gate array (FPGA), a central processing unit (CPU), a microcontroller, and a microprocessor.

When the driving of the second vehicle is stopped, the processor 150 may be configured to determine whether the second vehicle is double-parked based on user input, gear stage information, and the like. For example, the processor 150 may be configured to determine that the second vehicle is double-parked when the driver selects a double parking mode via a user interface (not shown) or selects neutral (N) as the transmission mode and then, exits the vehicle after stopping an engine (or a motor) of the second vehicle. The processor 150 may be configured to operate the transmission controller 143 to change the transmission mode to park (P) and then enter a standby mode in response to determining that the second vehicle is double-parked. The electric power supply to the communication device 110, the sensor 120, and the processor 150 may be maintained even when the engine of the second vehicle is stopped.

The processor 150 may be configured to detect or sense the departure intention of the first vehicle (e.g., the second vehicle is obstructing the departure of the first vehicle) via the communication device 110 or the sensor 120. In other words, the processor 150 may be configured to detect the vehicle having the intention of departing in the vehicles parked around the second vehicle. The processor 150 may be configured to monitor the movement of the first vehicle using the sensor 120 to determine whether the first vehicle has the intention to depart or exit the parking space. The processor 150 may be configured to detect the movement of the first vehicle based on distance information between the first and second vehicles measured by the distance sensor 121 and the location change of the first vehicle obtained by analyzing the surrounding image photographed using the camera 122. The processor 150 may then be configured to determine whether the first vehicle has the intention to depart based on the movement of the first vehicle.

Meanwhile, the processor 150 may be configured to receive the vehicle movement request transmitted from the first vehicle via the communication device 110. The vehicle movement request message received via the communication device 110 may include identification information of the first vehicle intending to exit a parking space. The processor 150 may be configured to determine whether the first vehicle has the intention of departing based on whether the vehicle movement request is received. For example, the first vehicle may be configured to output information regarding other vehicles located around the first vehicle to the display or interface. When the driver of the first vehicle selects one of the displayed vehicles, movement (moving and parking) may be requested to the selected vehicle using the communication device. When the selected vehicle receives the vehicle movement request from the first vehicle, the selected vehicle may be configured to determine an exit intention of the first vehicle.

Further, the processor 150 may be configured to receive operating state information from the first vehicle via the communication device 110. The processor 150 may be configured to determine whether the first vehicle has the intention of departing based on whether the operating state of the first vehicle is switched from the stop state to the startup state via the communication device 110. Meanwhile, the processor 150 may be configured to determine whether the first vehicle has the intention of departing based on whether a tap is detected in a specified area on an outer surface of the second vehicle. The processor 150 may be configured to detect an impact applied to the outer surface of the second vehicle using the impact sensor 123 in the sensor 120, and when the point at which the detected impact is applied is within a specified area, may be configured to determine that the first vehicle has the departing intention.

In addition, when an impact is applied to the exterior of the second vehicle in a state where a plurality of vehicles are present around the second vehicle, the processor 150 may be configured to identify the operating states of the surrounding vehicles via the communication device 110 to recognize the exit intention of the first vehicle. In other words, when the processor 150 is unable to recognize the first vehicle having the intention of exiting due to the presence of a plurality of vehicles around the second vehicle in a state where an impact on the exterior of the second vehicle is detected, the processor 150 may be configured to identify the operating states of surrounding vehicles via the communication device 110 to thus recognize, as the first vehicle having the intention of departing, the operating state of the vehicle is switched from the stop state to the startup state.

The processor 150 may be further configured to detect the movement of the second vehicle when the first vehicle has an intention to depart. Then, the processor 150 may be configured to obtain the surrounding information of the second vehicle using the sensor 120, and determine whether it is possible for the first vehicle to depart only by moving the second vehicle, based on the obtained surrounding information. In particular, the processor 150 may be configured to calculate the required distance and direction in which the second vehicle must move for the first vehicle to exit the parking space, compare the calculated required distance and the movable distance that the second vehicle may move in the current state, and determine whether the departure of the first vehicle is possible only by moving the second vehicle based on the comparison result. For example, when the distance that the second vehicle may move is less than the distance that the second vehicle must move, the processor 150 may be configured to determine that it is impossible for the first vehicle to depart only by moving the second vehicle.

The processor 150 may be configured to generate a movement plan or path for movement of the second vehicle when the departure of the first vehicle is possible only by the movement of the second vehicle. In other words, the processor 150 may be configured to determine a location to move the second vehicle to while prevention obstruction of the exiting of the first vehicle, and generate a path for reaching the determined location. Meanwhile, when it is impossible for the first vehicle to depart only by the movement of the second vehicle, that is, when the movement of at least one third vehicle as well as the second vehicle is further required, the processor 150 may be configured to select one from the at least one third vehicle parked as an additional movement target vehicle. Particularly, the processor 150 may be configured to select the additional movement target vehicle based on at least one of the distance between the second and third vehicles, the center position of the second vehicle with respect to the center of the first vehicle, and the departure direction of the first vehicle.

For example, when the vehicles are located in front of and behind the second vehicle, respectively, the processor 150 may be configured to measure the distance between the second vehicle and the front vehicle and the distance between the second vehicle and the rear vehicle using the distance sensor 121, compare the two distances with each other, and select a vehicle located further away from the second vehicle as the additional movement target vehicle.

Alternatively, the processor 150 may be configured to determine, using the distance sensor 121 and the camera 122, which side of the center of the second vehicle is more biased with respect to the center of the first vehicle, and select a vehicle located in the direction in which the center of the second vehicle is more biased as the additional movement target vehicle. As another option, the processor 150 may be configured to receive information regarding the departure direction from the first vehicle via the communication device 110, and select the forward vehicle or the rear vehicle as an additional movement target vehicle based on the departure direction of the first vehicle.

The processor 150 may be configured to generate a movement plan of the second vehicle and the additional movement target vehicle when the additional movement target vehicle is selected. In particular, the processor 150 may be configured to calculate the required distance and direction in which the additional movement target vehicle must move based on the information regarding the distance between the second vehicle and the additional movement target vehicle, and transmit information regarding the calculated required distance and direction to the additional movement target vehicle via the communication device 110.

The processor 150 may be configured to adjust the autonomous movement of the second vehicle corresponding to the generated movement plan. Additionally, the processor 150 may be configured to adjust the autonomous movement of the second vehicle and the additional movement target vehicle corresponding to the generated movement plan. The processor of the vehicle control apparatus mounted on the third vehicle selected as the additional movement target vehicle may be configured to operate the vehicle controller in response to the received movement request when receiving the movement request via the communication device, to thus move the third vehicle by the distance requested from the second vehicle. The processor 150 may be configured to move the second vehicle using the vehicle controller 140 after the third vehicle is moved.

Further, the processor 150 may be configured to determine whether the first vehicle exits after moving the second vehicle or the second vehicle and the additional movement target vehicle. The processor 150 may be configured to determine whether the first vehicle exits after moving the second vehicle or the second vehicle and the additional movement target vehicle. Then, the processor 150 may be configured to park the second vehicle in an empty or vacant parking space due to the departure of the first vehicle when the departure of the first vehicle is completed. The processor 150 may be configured to execute the parking of the second vehicle in the empty parking space due to the departure of the first vehicle using a remote smart parking assist (RSPA) function.

Figure 2:
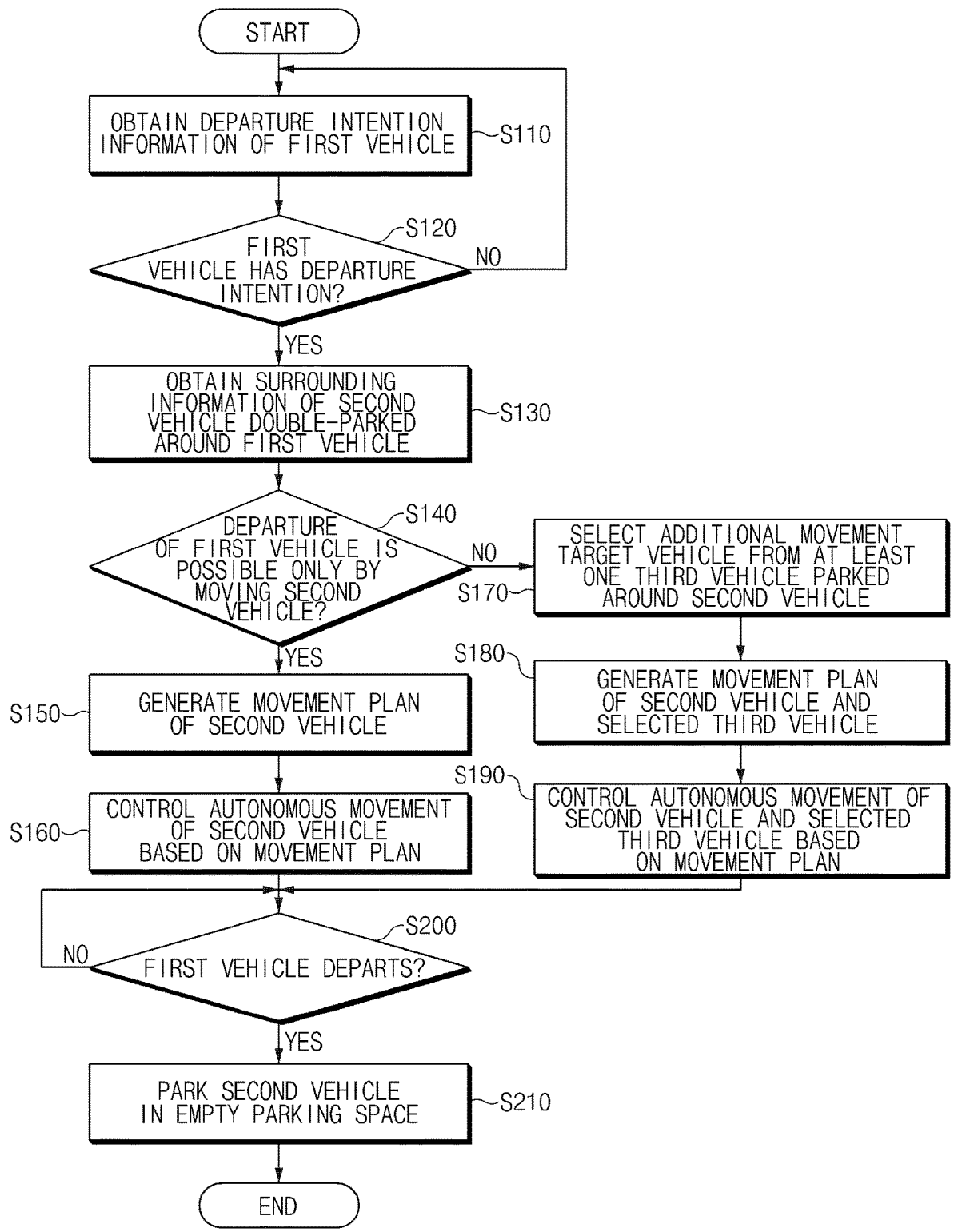
FIG. 2 is a flowchart illustrating a vehicle control method according to an exemplary embodiment of the present disclosure.

FIG. 2 is a flowchart illustrating a vehicle control method according to an exemplary embodiment of the present disclosure. In the present exemplary embodiment, to facilitate the understanding of the explanation, it may be assumed that the second vehicle is double-parked around the first vehicle. In S110, the processor 150 of the vehicle control apparatus mounted on the second vehicle may be configured to obtain the departure intention information of the first vehicle using the sensor 120. The processor 150 may be configured to monitor the movement of the first vehicle of which the departure is obstructed by the second vehicle using the distance sensor 121 and the camera 122 in response to identifying that the second vehicle is double parked. In other words, the processor 150 may be configured to obtain the distance information between the first and second vehicles measured by the distance sensor 121 and the surrounding image of the first vehicle photographed using the camera 122 as the departure intention information.

In S120, the processor 150 may be configured to determine whether the first vehicle has a departure intention based on the departure intention information of the first vehicle. The processor 150 may be configured to analyze the distance information between the first and second vehicles and the surrounding image to determine whether the first vehicle intends to exit the parking space. For example, when the distance between the first and second vehicles is decreased, the processor 150 may be configured to determine that the first vehicle intends to exit the parking space. When the distance between the first and second vehicles is not changed or is increased, the processor 150 may be configured to determine that the first vehicle does not intend to depart.

In S130, when the first vehicle has an intention to depart, the processor 150 may be configured to obtain the surrounding information of the second vehicle that is double-parked around the first vehicle using the sensor 120. The processor 150 may be configured to obtain the distance between the first and second vehicles and/or the distance between the second vehicle and the front and/or rear vehicle of the second vehicle using the distance sensor 121. In addition, the processor 150 may be configured to obtain the surrounding image of the second vehicle using the camera 122.

In S140, the processor 150 may be configured to determine whether the departure of the first vehicle is possible only by moving the second vehicle based on the obtained surrounding information of the second vehicle. The processor 150 may be configured to calculate the required distance and direction in which the second vehicle must move for departure of the first vehicle based on the obtained surrounding information. In addition, the processor 150 may be configured to calculate the distance (e.g., movable distance) and the direction that the second vehicle is moveable based on the obtained surrounding information. The processor 150 may be configured to compare the calculated distances and determine whether the departure of the first vehicle is possible only by moving the second vehicle.

For example, when it is possible for the first vehicle to depart when the second vehicle moves about 2 m in the right direction or about 3 m in the left direction based on the first vehicle, the processor 150 may be configured to determine that the departure of the first vehicle is possible when the second vehicle moves about 2 m in the right direction or about 3.5 m in the left direction. Additionally, the processor 150 may be configured to determine that the departure of the first vehicle is impossible when the second vehicle moves about 1 m in the right direction or about 2.5 m in the left direction although the departure of the first vehicle is possible when the second vehicle moves about 2 m in the right direction and about 3 m in the left direction based on the first vehicle.

In S150, the processor 150 may be configured to generate the movement plan or path of the second vehicle when the departure of the first vehicle is possible only by moving the second vehicle. In other words, the processor 150 may be configured to generate a path for moving the second vehicle to another location that does not disturb or obstruct the departure of the first vehicle. Particularly, the processor 150 may be configured to generate another position (e.g., a target position or location) to move the second vehicle based on the surrounding information of the second vehicle obtained using the sensor 120, and a path for moving the second vehicle from the current position to the another position.

In S160, the processor 150 may be configured to adjust the autonomous movement of the second vehicle based on the generated movement plan. The processor 150 may be configured to operate the vehicle controller 140 based on the generated movement plan to move the second vehicle to a location at which the second vehicle does not obstruct the departure of the first vehicle. The vehicle controller 140 may be configured to operate at least one of the braking controller 141, the driving controller 142, the transmission controller 143 and the steering controller 144 corresponding to the instruction of the processor 150, thereby allowing the second vehicle to perform the autonomous movement.

Meanwhile, in S170, the processor 150 may be configured to select an additional movement target vehicle from the at least one or more third vehicles parked around the second vehicle when it is impossible for the first vehicle to depart only by moving the second vehicle. The processor 150 may also be configured to select one from the at least one or more third vehicles parked around the second vehicle as the vehicle (the additional movement target vehicle) to be additionally moved when it is impossible for the first vehicle to depart only by moving the second vehicle. In particular, the processor 150 may be configured to select the additional movement target vehicle based on the separation distance and the relative position (orientation) based on the second vehicle.

In S180, when the additional movement target vehicle is selected, the processor 150 may be configured to generate a movement plan of the second vehicle and the additional movement target vehicle. The processor 150 may be configured to calculate the required distances that the second vehicle and the third vehicle selected as the additional moving object must move respectively, and output a notification regarding this distance to the selected third vehicle. For example, the processor 150 may be configured to transmit a message of requesting movement of about 1 m via the communication device 110 to the third vehicle when the second vehicle must move about 3 m but can move only about 2 m for the departure of the first vehicle.

In S190, the processor 150 may be configured to adjust the autonomous movements of the second vehicle and the additional movement target vehicle based on the movement plan. The processor of the vehicle control apparatus mounted within the third vehicle selected as the additional movement target vehicle may be configured to operate the vehicle controller in response to the received movement request to move the third vehicle by the distance requested from the second vehicle in response to receiving the movement request via the communication device. The processor 150 may be configured to move the second vehicle using the vehicle controller 140 after the third vehicle is moved.

In S200, the processor 150 may be configured to determine whether the departure of the first vehicle is completed. Particularly, the processor 150 may be configured to determine whether the first vehicle departs after moving the second vehicle or the second vehicle and the additional movement target vehicle. In S210, when the departure of the first vehicle is detected, the processor 150 may be configured to park the second vehicle in the vacant parking space due to the departure of the first vehicle. The processor 150 may be configured to execute the parking of the second vehicle in the vacant parking space due to the departure of the first vehicle using the smart parking assist function.

Figure 3A:
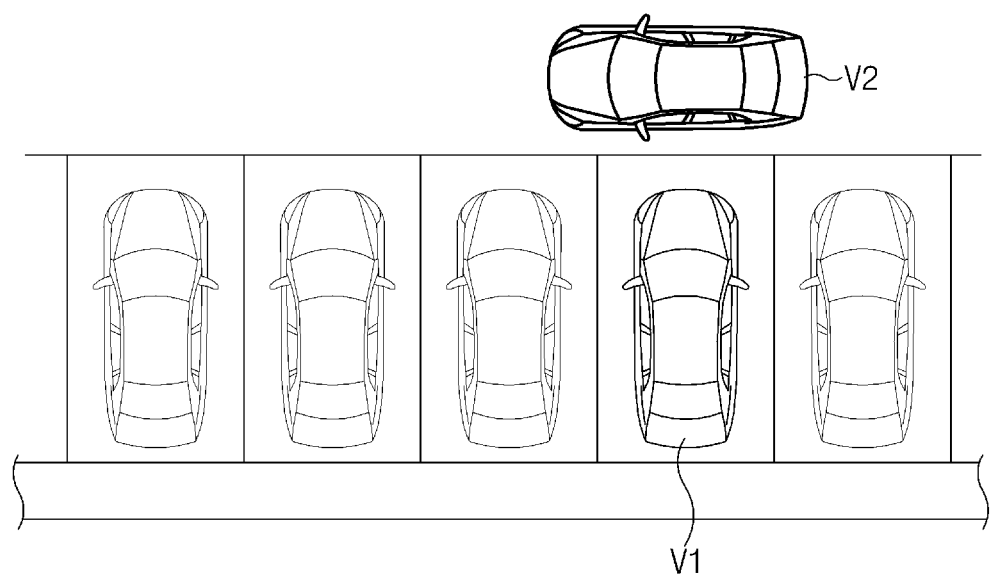
FIGS. 3A to 3C are views illustrating a first example of the autonomous movement of a double-parked vehicle according to an exemplary embodiment of the present disclosure.
Figure 3B:
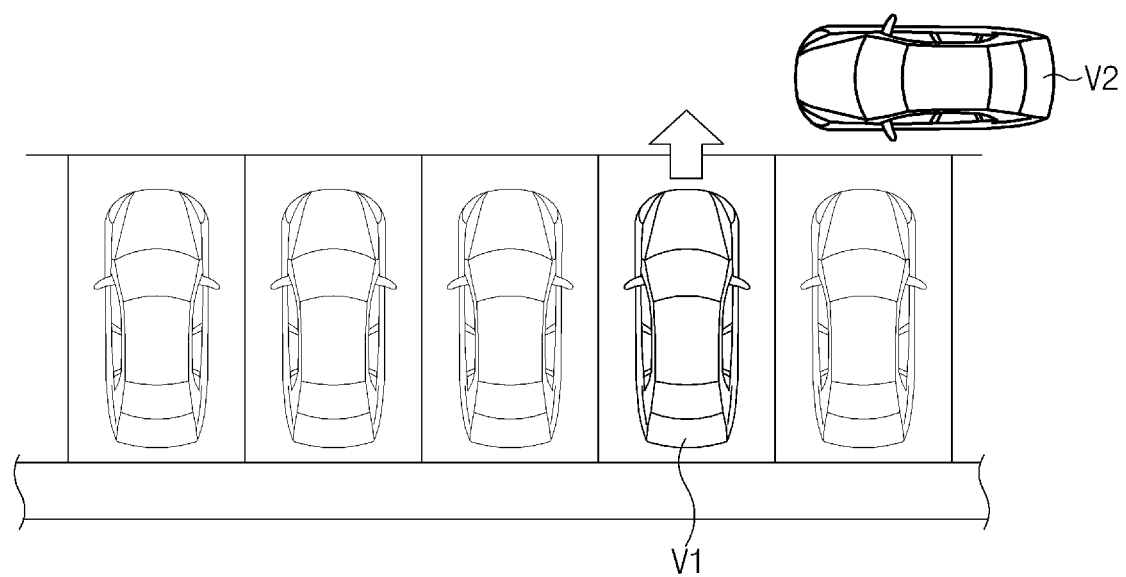
Figure 3C:
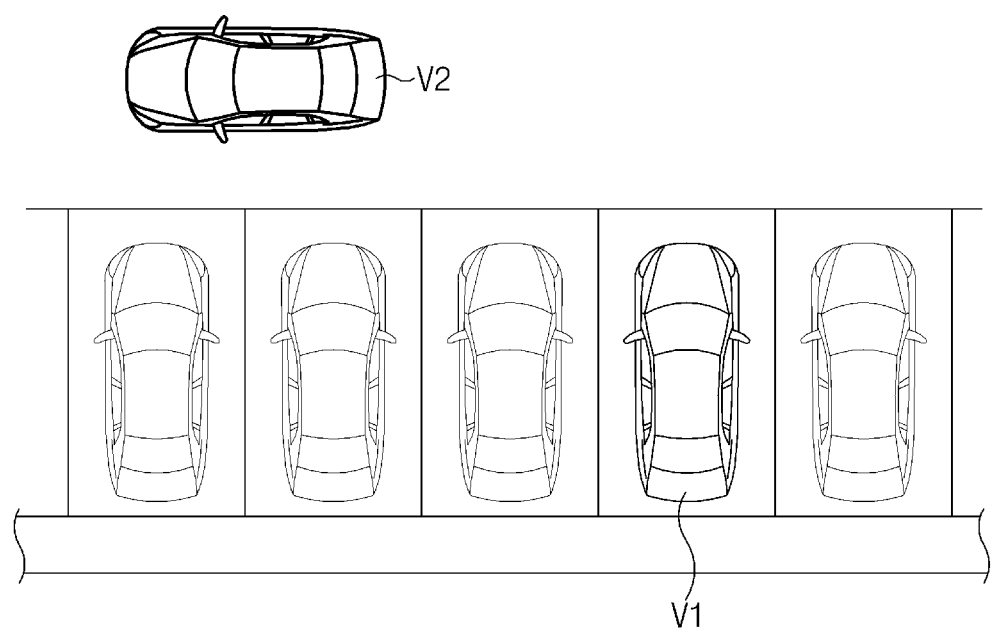

Hereinafter, an example of controlling the autonomous movement of the double-parked vehicle according to the present disclosure will be described. In the following description, to facilitate the understanding of the explanation, it may be assumed that each of the first to fifth vehicles V1 to V5 include a vehicle controller. FIGS. 3A to 3C are views illustrating a first example of the autonomous movement of a double-parked vehicle according to the present disclosure.

As shown in FIG. 3A, when the second vehicle V2 is double-parked in front of the first vehicle V1 parked in a parking space, the second vehicle V2 may be configured to monitor the first vehicle V1 using the sensor 120. The second vehicle V2 may be configured to detect the movement of the first vehicle V1 to determine whether the first vehicle V1 has an intention to exit the parking space. For example, the second vehicle V2 may be configured to determine that the first vehicle V1 intends to depart when the first vehicle V1 moves closer to the second vehicle V2.

The second vehicle V2 may be configured to obtain the surrounding information using the sensor 120 and analyze the obtained surrounding information to determine the surrounding situation (e.g., detect other parked vehicles, etc.). The second vehicle V2 may be configured to determine whether the departure of the first vehicle V1 is possible only by its own movement. The second vehicle V2 may be configured to calculate the required distance by which the second vehicle V2 must move for the departure of the first vehicle V1 based on the surrounding information and determine whether it is possible for the second vehicle V2 to move by the calculated required distance.

The second vehicle V2 may be configured to operate the vehicle controller 140 to move the vehicle by the required distance when the second vehicle V2 is capable of moving by the required distance. As shown in FIG. 3B, the vehicle controller 140 may be configured to move the second vehicle V2 to another location by the required distance. The second vehicle V2 may remain in a standby mode until the first vehicle V1 exits the parking space. Thereafter, the second vehicle V2 may be configured to execute autonomous parking into the vacant parking space due to the departure of the first vehicle V1 (see FIG. 3C).

Figure 4A:
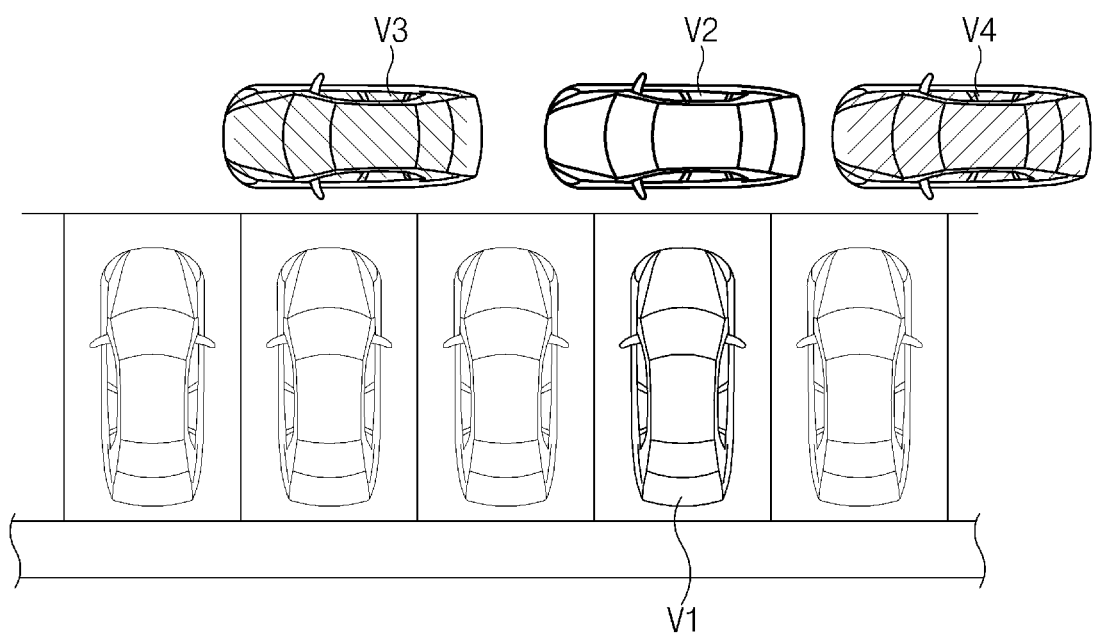
FIGS. 4A to 4C are views illustrating a second example of the autonomous movement of a double-parked vehicle according to an exemplary embodiment of the present disclosure.
Figure 4B:
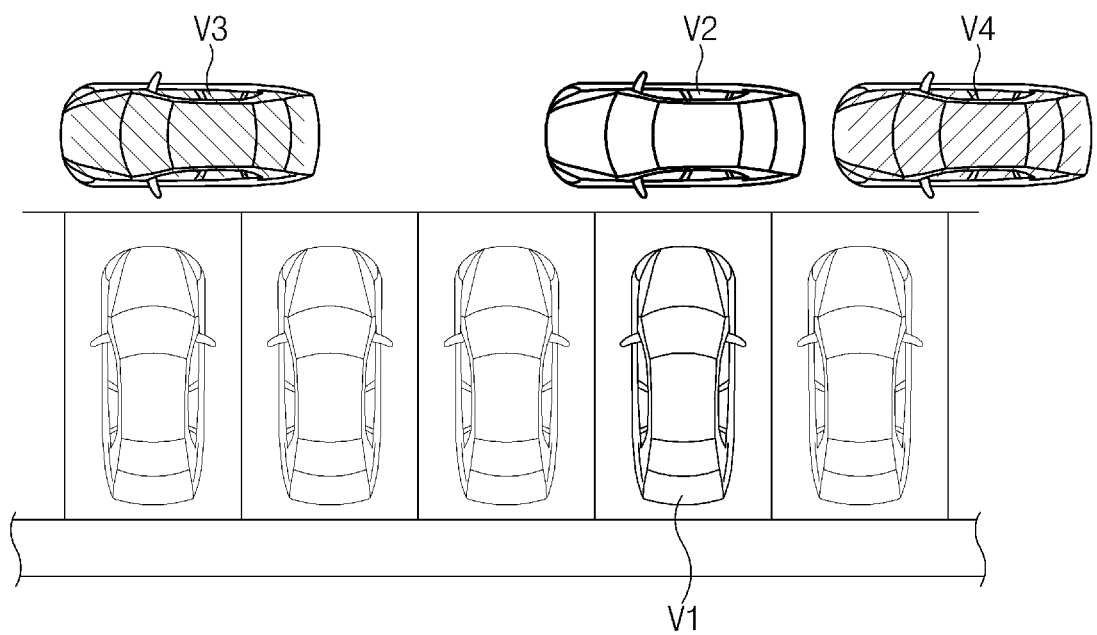
Figure 4C:
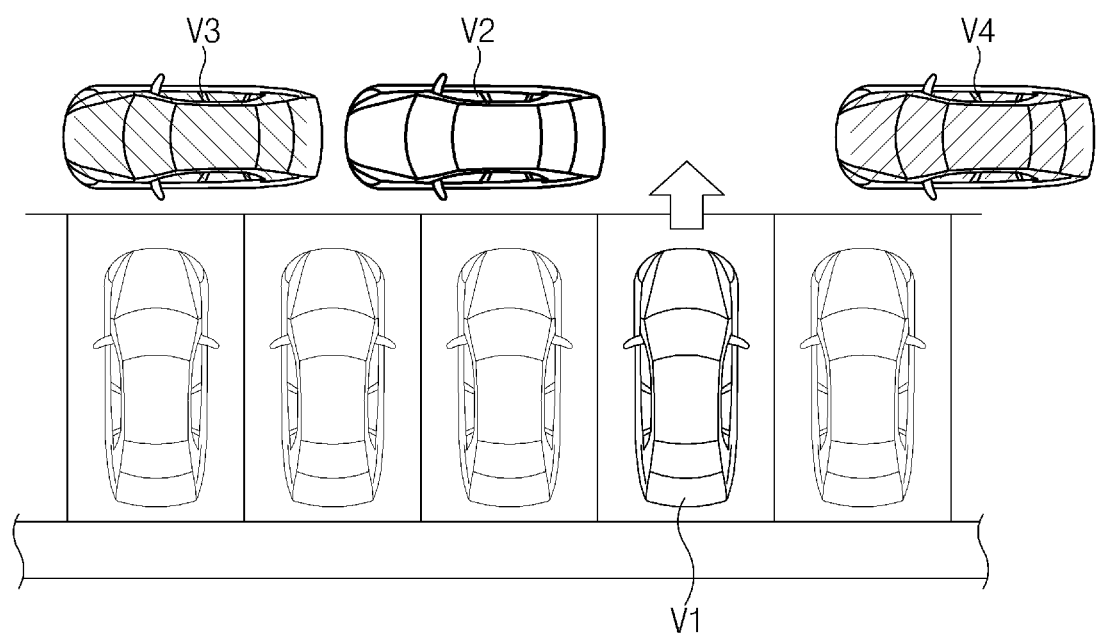

FIGS. 4A to 4C are views illustrating a second example of the autonomous movement of a double-parked vehicle according to the present disclosure. As shown in FIG. 4A, when the second vehicle V2 is double-parked in front of the first vehicle V1, and the third and fourth vehicles V3 and V4 are parked in front of and behind the second vehicle V2, respectively, the processor 150 of the second vehicle V2 may be configured to detect an exit intention of the first vehicle V1 using the sensor 120. In response to determining the exit intention of the first vehicle V1, the second vehicle V2 may be configured to determine whether the departure of the first vehicle V1 is possible only by moving the second vehicle V2 based on the surrounding information of the second vehicle V2 obtained using the sensor 120. When it is impossible for the first vehicle V1 to depart only by moving the second vehicle V2, the second vehicle V2 may be configured to determine which of the third vehicle V3 and the fourth vehicle V4 requires further movement to allow the first vehicle V1 to exit the space.

The second vehicle V2 may be configured to measure the distances that the third vehicle V3 and the fourth vehicle V4 are separated from the second vehicle V2 using the distance sensor 121, respectively (e.g., V3 to V2 and V4 to V2). The second vehicle V2 may be configured to compare the two distances and select the third vehicle V3 having a greater separation distance as an additional movement target vehicle. The second vehicle V2 may be configured to request the third vehicle V3 to move using wireless communication. As shown in FIG. 4B, the third vehicle V3 may be configured to move to another location in response to the movement request of the second vehicle V2. Thereafter, when the movement of the third vehicle V3 is completed, the second vehicle V2 may be configured to move by the required distance determined so that the departure of the first vehicle V1 is possible as shown in FIG. 4C. Then, the first vehicle V1 may be configured to exit the parking space.

Figure 5A:
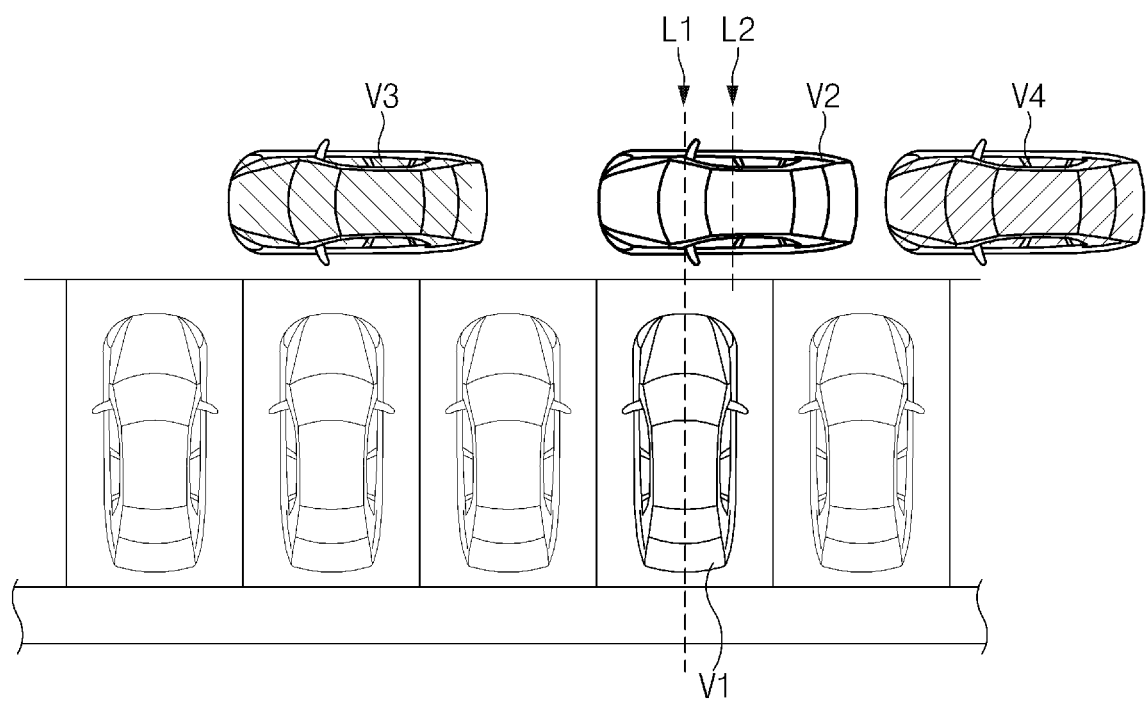
FIGS. 5A and 5B are views illustrating a third example of the autonomous movement of a double-parked vehicle according to an exemplary embodiment of the present disclosure.
Figure 5B:
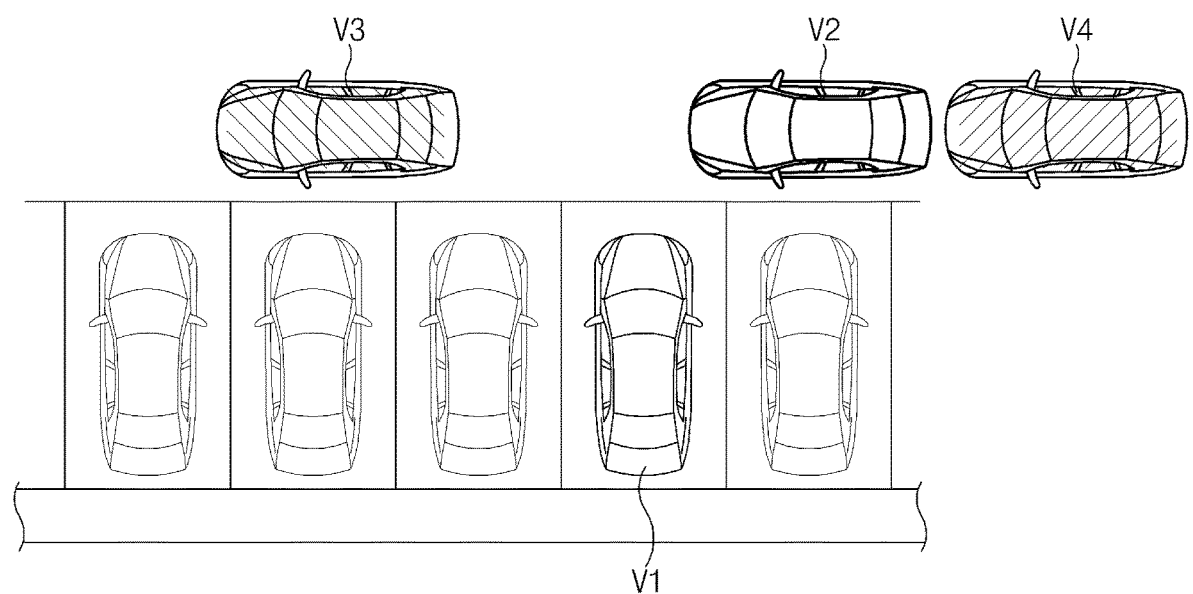

FIGS. 5A and 5B are views illustrating a third example of autonomous movement of a double-parked vehicle according to the present disclosure. When the second vehicle V2 is double-parked in front of the first vehicle V1, when it is impossible for the first vehicle V1 to depart only by moving the second vehicle V2 due to the third and fourth vehicles V3 and V4 parked in front of and behind the second vehicle V2, respectively, the second vehicle V2 may be configured to select a vehicle to be further moved from the third and fourth vehicles V3 and V4. The second vehicle V2 may be configured to determine which direction the center position L2 of the second vehicle V2 is biased based on the center position L1 of the first vehicle V1 based on the surrounding information obtained using the sensor 120. As shown in FIG. 5A, when the center position L2 of the second vehicle V2 is located on the right side with respect to the center position L1 of the first vehicle V1, the second vehicle V2 may be configured to select the fourth vehicle V4 as the vehicle to be further moved.

Thereafter, as shown in FIG. 5B, the fourth vehicle V4 may be configured to execute autonomous movement in response to the movement request of the second vehicle V2, and the second vehicle V2 may be configured to determine whether the fourth vehicle V4 moves by the requested distance. When the fourth vehicle V4 moves by the requested distance, the second vehicle V2 may be configured to move autonomously by the distance required for the departure of the first vehicle V1.

Figure 6A:
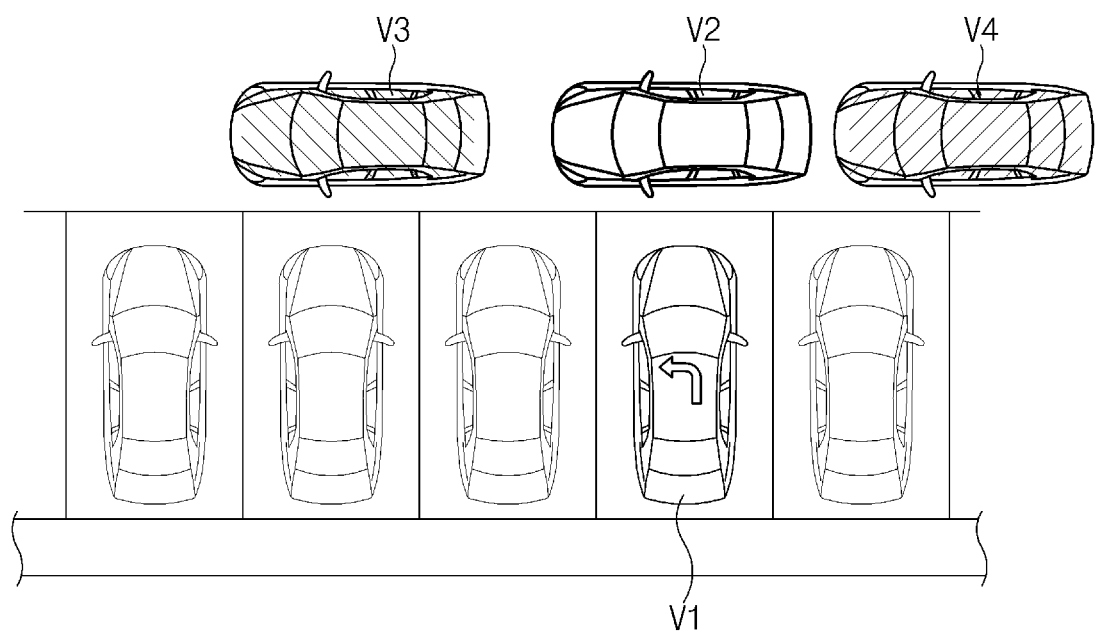
FIGS. 6A and 6B are views illustrating a fourth example of the autonomous movement of a double-parked vehicle according to an exemplary embodiment of the present disclosure.
Figure 6B:
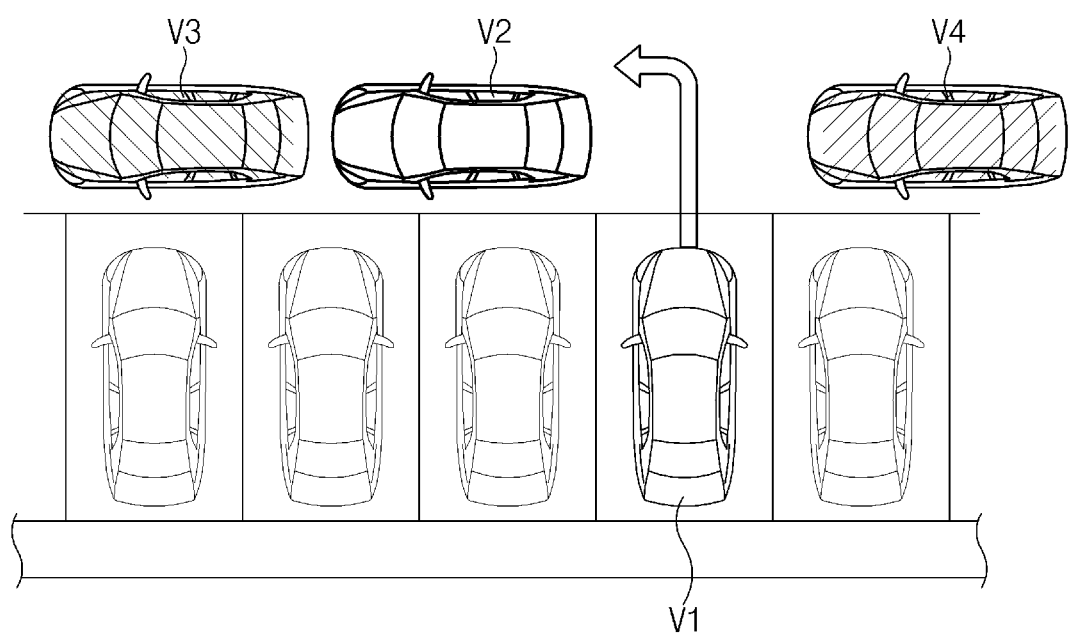

FIGS. 6A and 6B are views illustrating a fourth example of the autonomous movement of a double-parked vehicle according to the present disclosure. When the second vehicle V2 is double-parked in front of the first vehicle V1, when the departure of the first vehicle V1 is impossible only by moving the second vehicle V2 due to the third and fourth vehicles V3 and V4 double-parked in front of and behind the second vehicle V2, respectively, the second vehicle V2 may be configured to select a vehicle to be further moved from the third and fourth vehicles V3 and V4.

In particular, the second vehicle V2 may be configured to determine the departure direction of the first vehicle V1 via wireless communication with the first vehicle V1. As shown in FIG. 6A, in response to detecting an exit intention of the first vehicle V1 in the left direction, the second vehicle V2 may be configured to request third vehicle V3 to move. Thereafter, when the second and third vehicles V2 and V3 perform the autonomous movement and do not interfere with the departure of the first vehicle V1, the first vehicle V1 may be configured to exit leftward as shown in FIG. 6B.

Figure 7A:
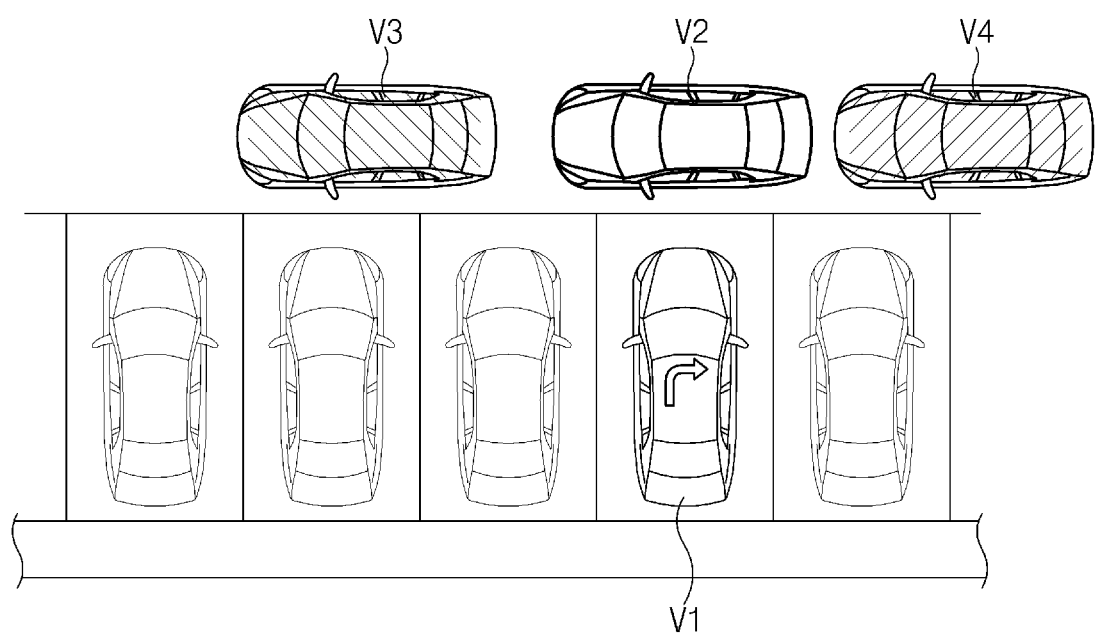
FIGS. 7A and 7B are views illustrating a fifth example of the autonomous movement of a double-parked vehicle according to an exemplary embodiment of the present disclosure.
Figure 7B:
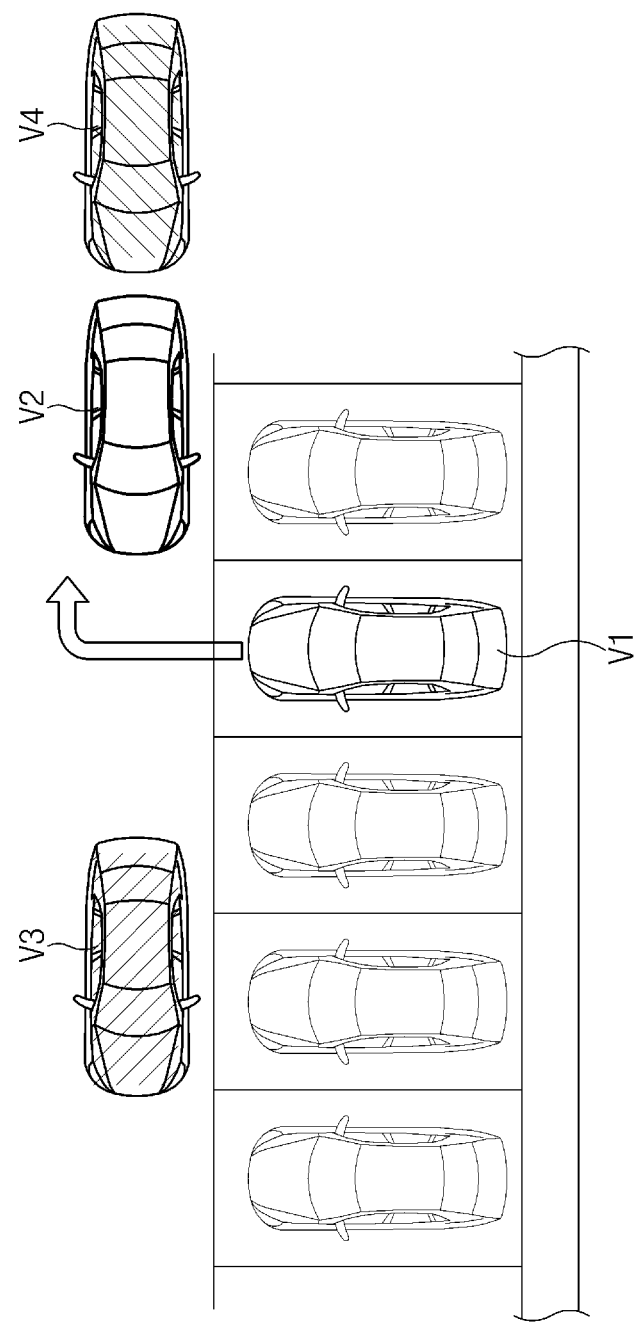

FIGS. 7A and 7B are views illustrating a fifth example of the autonomous movement of a double-parked vehicle according to the present disclosure. When the second vehicle V2 is double-parked in front of the first vehicle V1, when it is impossible for the first vehicle V1 to depart only by moving the second vehicle V2 due to the third vehicle V3 and the fourth vehicle V4 parked in front of and behind the second vehicle V2, respectively, the second vehicle V2 may be configured to select a vehicle to be moved from the third and fourth vehicles V3 and V4.

Particularly, the second vehicle V2 may be configured to determine the departure direction of the first vehicle V1 via wireless communication with the first vehicle V1. As shown in FIG. 7A, when the first vehicle intends to depart rightward based on the determination result, the second vehicle V2 may be configured to request the fourth vehicle V4 to move. Thereafter, when the second and fourth vehicles V2 and V4 perform the autonomous movement and do not interfere with the departure of the first vehicle V1, the first vehicle V1 may be configured to exit rightward as shown in FIG. 7B.

Figure 8:
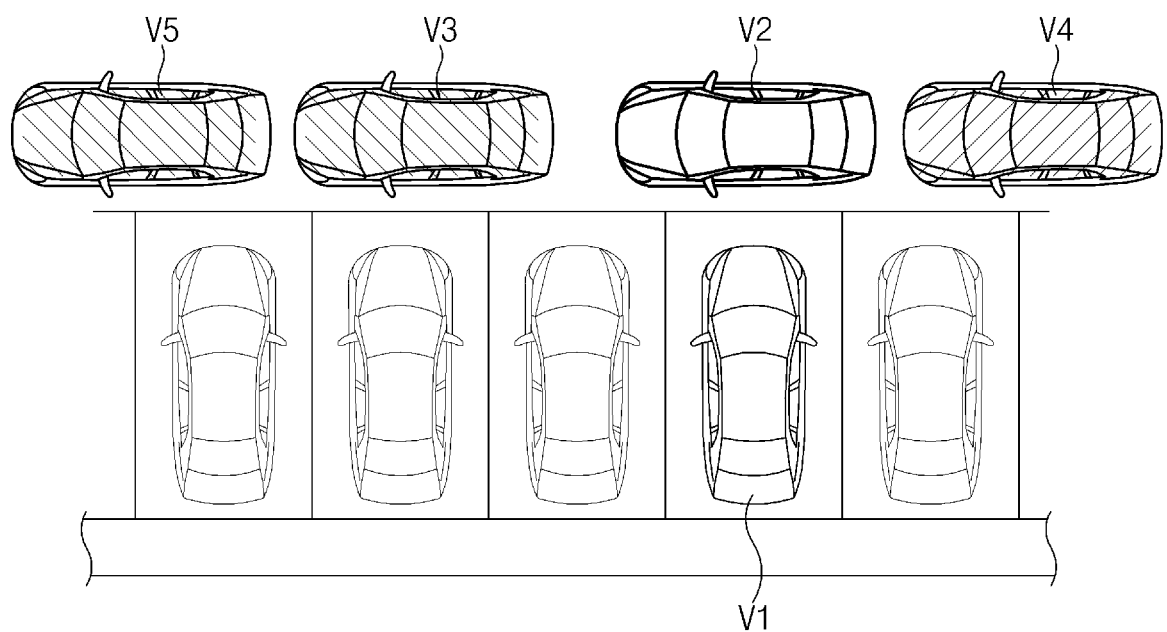
FIG. 8 is a view illustrating a sixth example of the autonomous movement of a double-parked vehicle according to an exemplary embodiment of the present disclosure.

FIG. 8 is a view illustrating a sixth example of the autonomous movement of a double-parked vehicle according to the present disclosure. Referring to FIG. 8, when the second vehicle V2 is double-parked in front of the first vehicle V1, when it is impossible for the first vehicle V1 to depart only by moving the second vehicle V2 due to the third and fourth vehicles V3 and V4 parked in front of and behind the second vehicle V2, respectively, the second vehicle V2 may be configured to select the third vehicle V3 as an additional movement target vehicle based on a preset reference.

The second vehicle V2 may be configured to request the third vehicle V3 to move by the distance obtained by subtracting the movable distance of the second vehicle V2 from the distance by which the second vehicle V2 must move for the departure of the first vehicle V1. The third vehicle V3 may be configured to obtain the surrounding information of the third vehicle V3 using the sensor 120 and determine whether the third vehicle V3 is capable of moving by the distance requested from the second vehicle V2 based on the obtained surrounding information. When the movement of the third vehicle V3 by the distance requested from the second vehicle V2 is impossible, the third vehicle V3 may be configured to request the fifth vehicle V5 to move by an insufficient distance.

Thereafter, the fifth vehicle V5 may be configured to determine whether it is possible to move by the distance required by the third vehicle V3, and perform the autonomous movement when movable. Then, the third vehicle V3 may be configured to execute the autonomous movement by the distance requested by the second vehicle V2, and the second vehicle V2 may be configured to execute the autonomous movement by the movement distance required for the departure of the first vehicle V1.

Figure 9:
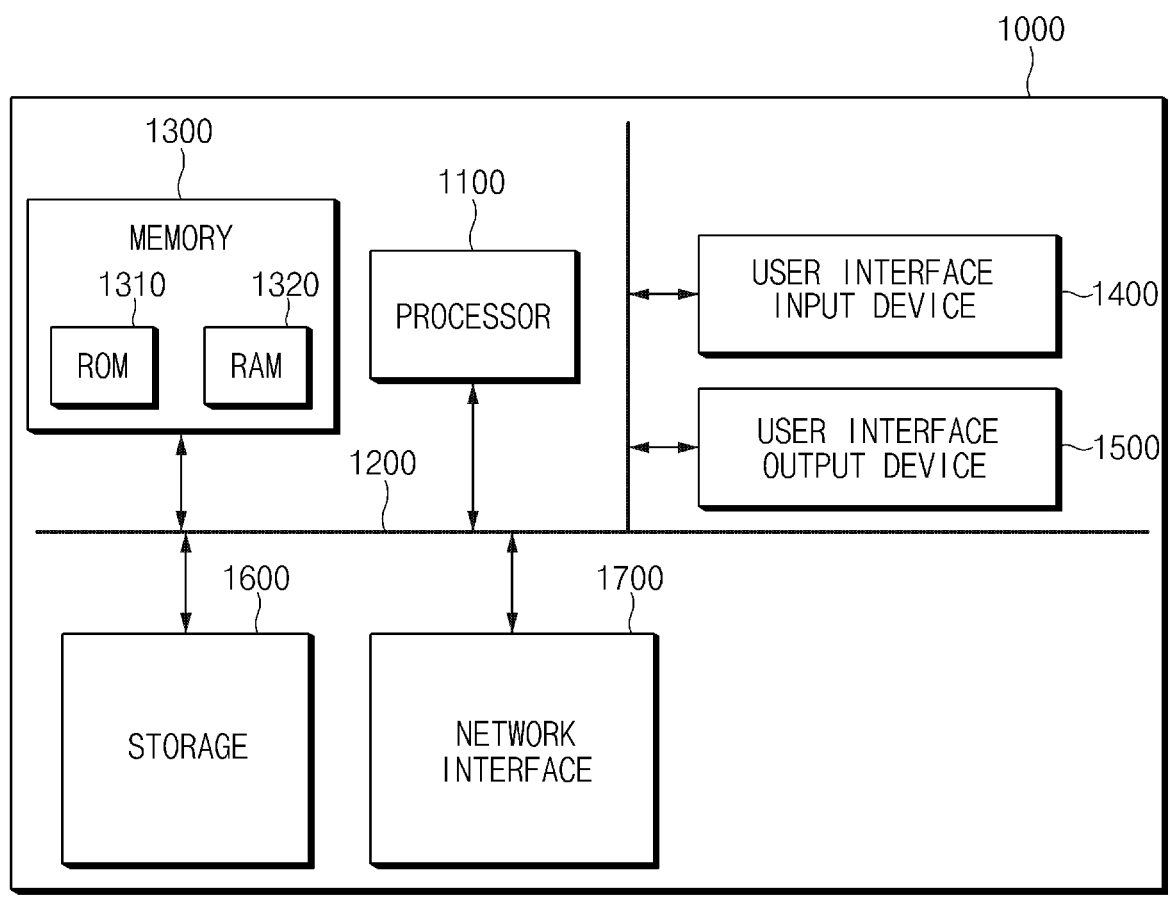
FIG. 9 illustrates a computing system for executing a vehicle control method according to an exemplary embodiment of the present disclosure.

FIG. 9 illustrates a computing system for executing a vehicle control method according to an exemplary embodiment of the present disclosure. Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processor (CPU) or a semiconductor device configured to process instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory). Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, since the departure intention of the parked vehicle may be determined and the moving parking of the vehicle double-parked around the parked vehicle may be executed, the vehicle, which was unable to depart due to the double parking, may depart without inconvenience.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. A vehicle control apparatus of a second vehicle for controlling movement of the second vehicle double-parked around a first vehicle parked in a parking space, comprising:
   a detector configured to detect departure intention information of the first vehicle and surrounding information of the second vehicle;
   a vehicle controller configured to execute autonomous movement of the second vehicle; and
   a processor configured to detect a departure intention of the first vehicle based on the departure intention information, generate a movement plan of the second vehicle for the departure of the first vehicle based on the surrounding information when the departure intention of the first vehicle is detected, and instruct the vehicle controller to move the second vehicle based on the movement plan.

2. The vehicle control apparatus of claim 1, wherein the detector includes:
   a distance sensor configured to sense a distance between the first vehicle and the second vehicle, and a distance between a nearby object of the second vehicle and the second vehicle; and
   a camera configured to obtain a surrounding image of the second vehicle.

3. The vehicle control apparatus of claim 2, wherein the processor is configured to analyze a distance information obtained using the distance sensor and the surrounding image obtained using the camera to detect movement of the first vehicle, and detect the departure intention of the first vehicle based on the movement of the first vehicle.

4. The vehicle control apparatus of claim 1, wherein the detector further includes:
   an impact sensor configured to sense an impact applied to an outer surface of the second vehicle,
   wherein the processor is configured to detect the departure intention of the first vehicle based on a point at which the impact is applied.

5. The vehicle control apparatus of claim 1, further comprising:
   a communication device configured to wirelessly communicate with the first vehicle,
   wherein the processor is configured to detect the departure intention of the first vehicle based on whether a vehicle movement request of the first vehicle is received via the communication device.

6. The vehicle control apparatus of claim 1, further comprising:
   a communication device configured to wirelessly communicate with the first vehicle,
   wherein the processor is configured to detect the departure intention of the first vehicle based on whether the first vehicle is switched from a stop state to startup state via the communication device.

7. The vehicle control apparatus of claim 1, wherein the processor is configured to:
   determine whether a departure of the first vehicle only by movement of the second vehicle is possible based on the surrounding information of the second vehicle when the departure intention of the first vehicle is detected; and
   generate the movement plan of the second vehicle based on whether the departure of the first vehicle is possible.

8. The vehicle control apparatus of claim 7, wherein the processor is configured to:
   calculate a movement distance and a direction of the second vehicle when the departure of the first vehicle only by the movement of the second vehicle is possible; and
   instruct the vehicle controller to move the second vehicle based on the calculated movement distance and the direction.

9. The vehicle control apparatus of claim 7, wherein the processor is configured to:
   select one from at least one third vehicle parked around the second vehicle as an additional moving target vehicle when the departure of the first vehicle only by the movement of the second vehicle is impossible; and determine and output a notification regarding a movement distance and a direction required for the selected third vehicle.

10. The vehicle control apparatus of claim 9, wherein the processor is configured to select the additional moving target vehicle based on at least one of a distance between the second and third vehicles, a center position of the second vehicle with respect to a center position of the first vehicle, and a departure direction of the first vehicle.

11. The vehicle control apparatus of claim 1, wherein the processor is configured to instruct the vehicle controller to park the second vehicle in a vacant parking space, vacant due to the departure of the first vehicle when the first vehicle departs.

12. A vehicle control method of controlling movement of a second vehicle double-parked around a first vehicle parked in a parking space, comprising:
   detecting, by a controller, departure intention information of the first vehicle;
   detecting, by the controller, a departure intention of the first vehicle based on the departure intention information of the first vehicle;
   generating, by the controller, a movement plan of the second vehicle for the departure of the first vehicle based on surrounding information of the second vehicle in response to detecting the departure intention of the first vehicle; and
   adjusting movement of the second vehicle based on the movement plan.

13. The vehicle control method of claim 12, further comprising:
   parking, by the controller, the second vehicle in a vacant parking space, vacant due to the departure of the first vehicle, when the departure of the first vehicle is identified after the movement of the second vehicle is adjusted.

14. The vehicle control method of claim 12, wherein the detecting of the departure intention information includes sensing a distance between the first and second vehicles using a distance sensor, and obtaining a surrounding image of the second vehicle using a camera.

15. The vehicle control method of claim 14, wherein the vehicle control method further includes determining the departure intention, and wherein the determining of the departure intention includes:
   sensing, by the controller, movement of the first vehicle by analyzing a distance information obtained using the distance sensor and the surrounding image obtained using the camera; and
   detecting, by the controller, the departure intention of the first vehicle based on the movement of the first vehicle.

16. The vehicle control method of claim 12, wherein the determining of the departure intention includes:
   detecting, by the controller, the departure intention of the first vehicle based on a position at which an impact is applied when the impact applied to an outer surface of the second vehicle is sensed.

17. The vehicle control method of claim 12, wherein the determining of the departure intention includes:
   detecting, by the controller, the departure intention of the first vehicle based on whether a vehicle movement request of the first vehicle is received.

18. The vehicle control method of claim 12, wherein the generating of the movement plan of the second vehicle includes:
   determining, by the controller, whether a departure of the first vehicle only by the movement of the second vehicle is possible based on the surrounding information of the second vehicle; and
   generating, by the controller, the movement plan of the second vehicle based on whether the departure of the first vehicle is possible.

19. The vehicle control method of claim 18, wherein the determining of whether the departure of the first vehicle is possible includes:
   calculating, by the controller, a movement distance and a direction of the second vehicle when the departure of the first vehicle only by the movement of the second vehicle is possible; and
   adjusting, by the controller, the movement of the second vehicle based on the calculated movement distance and direction.

20. The vehicle control method of claim 18, wherein the determining of whether the departure of the first vehicle is possible includes:
   selecting, by the controller, one from at least one third vehicle parked around the second vehicle as an additional moving target vehicle when the departure of the first vehicle only by the movement of the second vehicle is impossible;
   generating, by the controller, the movement plan of the second vehicle and a movement plan of the selected third vehicle; and
   adjusting, by the controller, autonomous movement of the second vehicle and the selected third vehicle based on the movement plans.

21. The vehicle control method of claim 20, wherein the selecting of the additional moving target vehicle includes:
   selecting, by the controller, the additional moving target vehicle based on at least one of a distance between the second and third vehicles, a center position of the second vehicle with respect to a center position of the first vehicle, and a departure direction of the first vehicle.

* * * * *